Aug. 15, 1939.  J. MILLS  2,169,367
METHOD FOR PREPARING FRUIT JUICE
Filed April 24, 1936    5 Sheets-Sheet 1

Inventor
JOHN MILLS
By
Richey & Watts
Attorneys

Aug. 15, 1939.  J. MILLS  2,169,367
METHOD FOR PREPARING FRUIT JUICE
Filed April 24, 1936   5 Sheets-Sheet 5

Fig.8

Inventor
JOHN MILLS

By Richey & Watts
Attorneys

Patented Aug. 15, 1939

2,169,367

UNITED STATES PATENT OFFICE 2,169,367

METHOD FOR PREPARING FRUIT JUICE

John Mills, Winter Haven, Fla., assignor, by mesne assignments, to Crown Can Company, Philadelphia, Pa., a corporation of Pennsylvania Application April 24, 1936, Serial No. 76,277

6 Claims. (Cl. 99—155)

This invention relates to the art of packing fruit juices. More particularly, it relates to packaged citrus fruit juice and to methods and apparatus for preparing and packaging the same.

The present invention is applicable to fruit products such as the juices of citrus fruits including tangerines, kumquats, tangerine limes, limes, lemons, oranges, grapefruit, tangelo, citron, grapefruit pomolo; juices or other fruits including apple, pear, grape and berry juices; juices of pulpy fruits such as pineapple, cantelope, peaches, tomatoes and the like; and under certain conditions, juices extracted from vegetables.

For the sake of brevity and certainty, the expression "fruit juices" as used herein is to be read and understood as referring to any one of the foregoing or analogous substances unless indicated to the contrary.

The present invention may be broadly described as including the steps of preparing and placing fruit juices in suitable containers, rendering the juices in the containers commercially sterile without developing any noticeable cooked taste and sealing the containers.

Many variations of the foregoing important steps may be made and many additional steps may be used, in combination with one or more of the foregoing steps or variations thereof. The preferred and also optional methods of packaging the various foregoing important steps and variations thereof and additions thereto, will appear more fully from the following description.

The present invention will be understood by those skilled in the art from the following detailed description thereof as practiced on and embodied in orange juice. The general process is thus described as follows:

The whole oranges are first treated to remove all, or all but a controlled amount of, the rind oil in the hulls, without breaking the hulls or bringing the liberated rind oil into contact with the orange juice in the fruit cells. Then the hulls of the thus treated fruit are opened and the fruit juice is removed, collected and separated from pulp and fibers. Next, the juice is screened and deaerated, and, in case the juice is to be sterilized by steam in a manner which will result in dilution of the juice by condensed steam, the juice is concentrated sufficiently to compensate for such dilution. Then this juice is placed in containers, is sterilized therein and finally sealed. This general process and variations thereof will be described hereinafter in connection with the description of apparatus shown in the accompanying drawings.

Citrus fruit juice embodying the present invention may be described as being commercially sterile, free from added sugar, substantially free from coarse pulp and fibrous material, containing at most only small quantities of very finely divided pulp, and containing a controllably small amount of rind oil which may be varied at will from substantially no such oil to an amount sufficient to give the juice a flavor. This juice has the taste, flavor, color and vitamin content substantially like that of the juice of fresh tree-ripened fruit. It will keep without deterioration, for long periods of time. When the juice of this invention is sealed in the container with steam therein under pressure, the sealed container contains such juice under a high vacuum, such as above about 20" of mercury.

In the drawings accompanying and forming a part of this specification.

Figure 1:
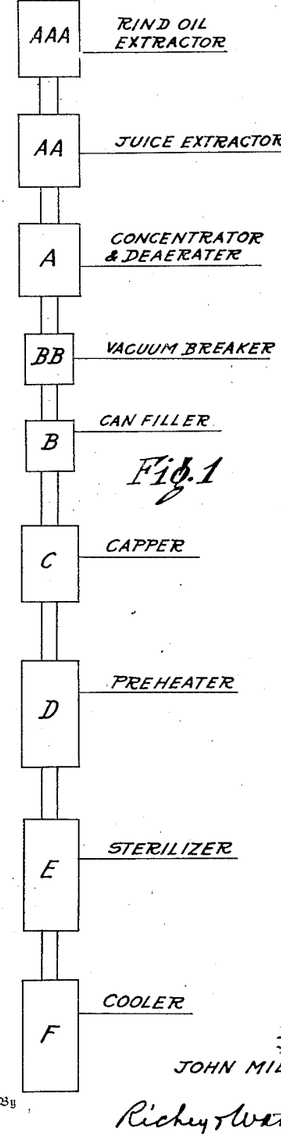
Figure 1 illustrates a flow diagram of the apparatus and steps used in one method of practicing the present invention.

Fig. 1 shows diagrammatically certain apparatus with which the present invention may be practiced. Such apparatus as shown in this figure consists of a rind oil extractor AAA, a juice extractor AA, both of which are shown in some detail in Figs. 4, 5, 6, 7 and 8 hereof, a concentrator and deaerator A, a vacuum breaker BB, a can filler B, a can capper C, a juice preheater D, a sterilizer E and a cooler F. The concentrator and deaerator A and part of E are shown on Fig. 3 and closely resemble the corresponding apparatus of my United States Patent No. 2,054,092. The filler B may consist of any ordinary device commonly used for delivering liquid into a can having an open top end. The capper C may be any suitable apparatus now in common use for applying the top end of a can to the body part thereof. The preheater D may consist of any apparatus suitable for heating the cans and fruit juice therein, for example, an open-ended chamber containing water heated by steam in which the cans are partly submerged while being conveyed thru the chamber by a suitable conveyor. In the preheater the juice in the cans may be heated to between about 100° F. and about 120° F. The sterilizer E may consist of the device shown in Figs. 2 to 10 inclusive of my United States Patent No. 2,054,092 and described therein.

Briefly described, this sterilizer apparatus consists of a turret mounted to rotate about a horizontal axis and provided around its periphery with a plurality of separate can carrying devices onto which may be charged cans partly filled with juice, and having valved ends, as shown in Figs. 13 and 14 of said patent. Cans carried by said devices contact with means for opening the valves thereof so that, as the turret revolves, a source of vacuum is applied to the interior of the can while it is moving thru a small arc, after which steam under pressure is admitted into the interior of the can so as to penetrate into all parts of the juice and thoroughly sterilize the same during a larger arc of rotation. When sterilized, the cans, with steam pressure therein, are discharged from the turret, the valved ends are crimped to retain the valves in seated position, whereupon the sealed cans are delivered to the cooler F where the temperature of the cans and their contents are quickly lowered.

The cooler F may be of any desired construction, for example, a runway along which the cans may roll while cooling water is sprayed thereon, or a tank of cool water thru which the cans may be propelled, or a combination of both such devices, the purpose being to cool the cans and their contents to a temperature below about 110° F. within about two minutes after the container has been permanently sealed.

Figures 2, 9:
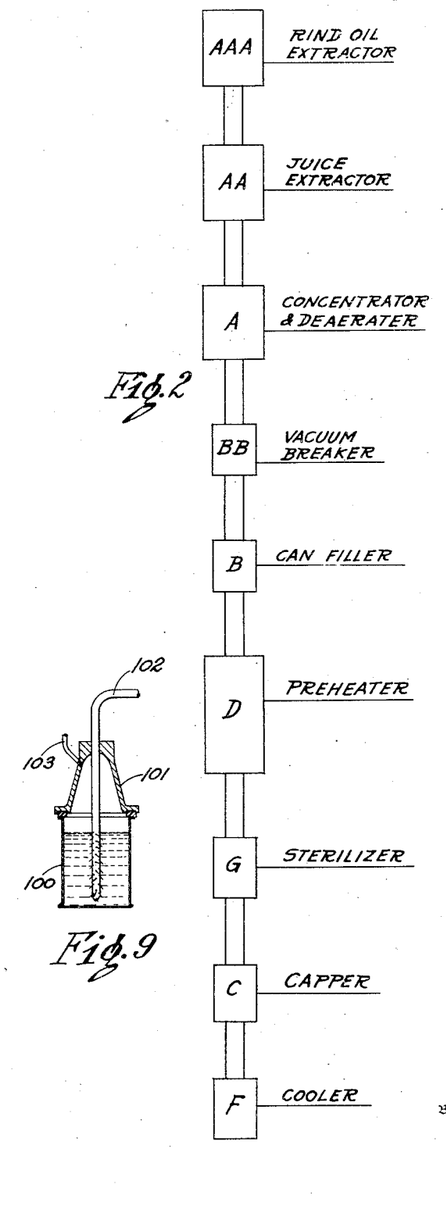
Fig. 2 is a flow diagram similar to Fig. 1, but showing a modified apparatus and modified steps for practicing the present invention.
Fig. 9 shows a modified form of apparatus for sterilizing the juice.

Fig. 2 shows diagrammatically a modified form of apparatus for practicing the present invention, wherein the devices AAA, AA, A, B, D and F may be of substantially the same construction as those mentioned in connection with Figure 1. The vacuum breaker BB of Figs. 1 and 2 is a device for breaking the vacuum on the juice delivered from the concentrator and deaerator A and its purpose is so to break this vacuum that the juice will not be so exposed to air that it might be absorbed by the juice. The vacuum breaker BB is shown on Fig. 3 hereof in combination with can filler B, and will presently be described.

The sterilizer G, shown somewhat diagrammatically in Fig. 9, differs considerably from the sterilizer E of Fig. 1. Sterilizer G will presently be described. Capper C may comprise any machine such as those now commonly in use for crimping the end of a can to the body thereof.

While Figs. 1 and 2 show similar, as well as different parts, it is to be understood that certain parts shown in one figure may be used with, or in place of, parts shown in the other figure. For example, the sterilizer G of Fig. 2 may replace the sterilizer E of Fig. 1, in which case the capper C of Fig. 2 would follow immediately after sterilizer G, and capper C of Fig. 1 would be omitted.

Moreover, the rind oil extractor AAA and the juice extractor AA of Figs. 1 and 2 may be replaced by any apparatus suitable for extracting juice from the fruit, although the use of both of these devices is preferred.

Referring to Figs. 4, 5, 6 and 7, wherein is shown apparatus for separately extracting rind oil and fruit juice according to the present invention, it will be seen that the apparatus consists of oil extractor AAA serving to remove the rind oil from whole citrus fruit and juice extractor AA serving to remove the fruit juice from the fruit previously treated by oil extractor AAA.

In these figures, apparatus AAA is constructed as follows: 1 designates a suitable supporting bed on which rests a framework consisting of cross arms 2 and posts 3 and 4. Posts 3 carry two similar units altho one unit or more than two units may be employed. Only one unit will be described in detail. At their upper ends, one set of posts 3 carries a bearing housing 5, within which a hollow cylindrical shaft 6 is mounted, bearings 7 being located between the housing and the shaft and its detachable ring 8, to facilitate rotation of the shaft within the housing. The ring 8 is provided with gear teeth 9 which mesh with a gear 10, the latter gear being driven from a motor or other source of power (not shown) thru shaft 11, gear 12 thereon and gear 13 meshing with gear 12 and connected to gear 10. Rotation of the shaft 11 thus causes rotation of shaft 6. Preferably shaft 11 rotates shaft 6 of each unit.

To the upper end of shaft 6, a circular table 14 is secured for rotation with the shaft. The upper end of the shaft 6 is closed by a plate 6a in the unit at the left hand end of Fig. 4, while shaft 6 is open thruout its length in the unit at the right hand end of Figure 4.

The table 14 of each unit is covered on its top surface with means for opening oil cells of citrus fruit. This means has a roughened or abrading surface and may consist of a thin sheet metal 14a, preferably stainless steel, having a plurality of short projections 14b extending upwardly, more or less completely covering its entire surface with a plurality of adjacent small openings thru the sheet, as will be described presently in more detail, in connection with Figure 7. The table 14 of each unit is preferably provided with large radially extending openings therethru and with a plurality of smaller holes, as will also be described later.

Posts 4 support, at their upper ends, a framework which may consist of angle irons 15 and 16, the former constituting sides and the latter constituting cross pieces of a framework above each of the tables 14. This framework supports, over each unit, a spider-like structure 17, from which, by means of angles 18 or equivalent means, members 19 may be suspended. These members 19 extend from a short distance above the top of the tables 14 to a point a number of inches thereabove, and preferably are sufficiently high to prevent whole citrus fruit from escaping from the curved path defined by the members 19 and the tables 14 thru which the fruit is intended to travel. The members 19 having a vertical height of six or eight inches near the outer periphery of tables 14, have been found to be sufficiently high when the tables 14 were about 6 feet in diameter and were rotated at about 100 revolutions per minute, but it will be understood that the height of members 19 may be changed as desired.

Members 19 are shown each as consisting of a single thickness of thin strip steel curved spirally so as to provide a curved passage defined by the members and tables 14 and extending between the central portion of each table and its outer periphery. Straight pieces 20 of similar strip steel are attached tangentially to the outer turns of each member 19 and extend across the small space between tables 14 where they are most nearly in contact. Members 19 are provided with short projections and holes therethru, substantially like the sheet 14a covering the top surface of tables 14.

Side frame members 15 also support a rind oil receiving pan 21 which extends from housings 5, below tables 14, to well above the top surfaces of the tables, the bottom of this pan being preferably sloped toward the outer extremities thereof, where one or more drain spouts 22 may be located.

Figures 6, 7:
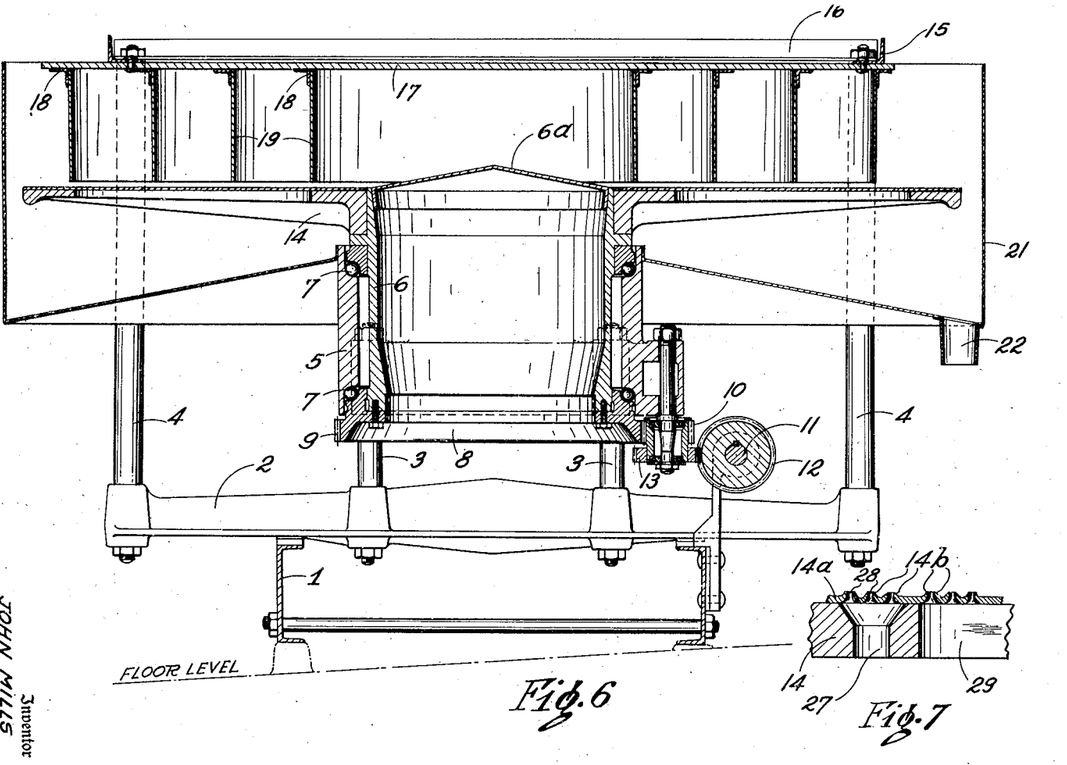
Fig. 6 is a transverse sectional view taken on line 6—6 of Fig. 5.
Fig. 7 is an enlarged fragmentary sectional view taken on line 7—7 of Fig. 5.

As indicated in Fig. 6, the bed 1, together with all the apparatus supported thereon, is tilted at a small angle to the horizontal, for a purpose presently to be described.

Figures 4, 5:
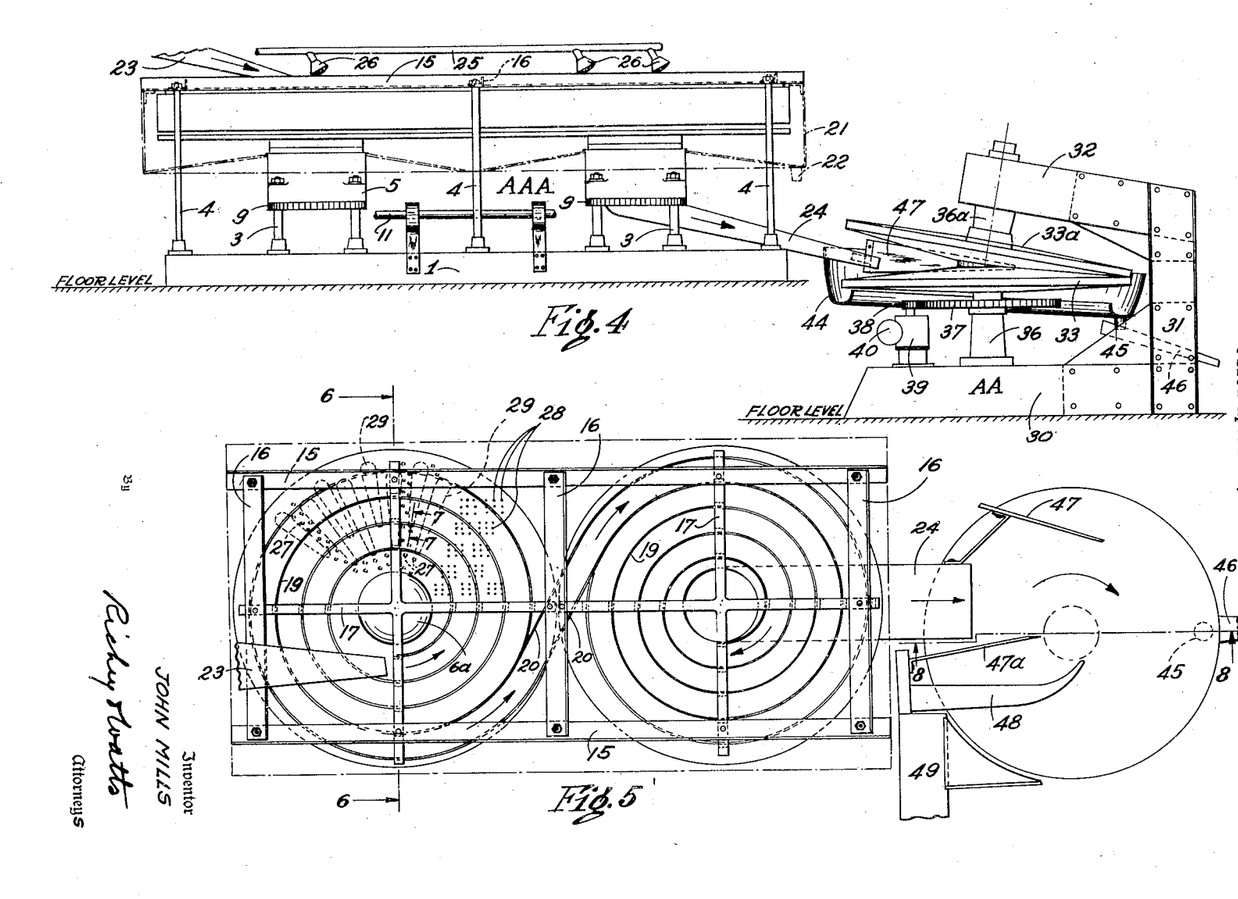
Fig. 4 shows in side elevation apparatus for removing the rind oil and fruit juice from citrus fruit according to the present invention.
Fig. 5 is a top plan view of the apparatus of Fig. 4.

In Figs. 4 and 5, 23 indicates suitable means such as a chute, thru which whole citrus fruit may be delivered to the left hand table, while 24 indicates a chute thru which fruit delivered from the right hand table 14 may pass. It will be noted from the direction arrows appearing on Fig. 5, that the fruit delivered from chute 23 travels outwardly from the central part of the left hand table 14 between turns of members 19, thence between members 20 to the outer periphery of the right hand table 14, and thence between turns of members 19 to the open central portion of the right hand table 14, where the fruit may fall through the hollow shaft 6 into chute 24. It will be understood, therefore, that the tables 14 preferably rotate in opposite directions, altho they may be rotated in the same direction if desired. It will also be understood that the direction of travel of the fruit may be reversed if desired.

In Figure 4 is shown a pipe 25 and nozzles 26 thru which water or other suitable liquid may be sprayed onto the tops of tables 14 and onto fruit being treated during operation of the apparatus. Any desired number of such nozzles may be used.

Figure 7 shows, fragmentarily, an enlarged section of table 14 and the thin sheet metal covering 14a thereon. This sheet 14a is what is commonly referred to in the trade as "fillet", that is, it is thin sheet or strip steel, a large part of which is provided with a plurality of very short projections 14b usually formed by punching small holes thru the sheet. These projections are sufficiently long to penetrate into the oil cells of citrus fruit but are not long enough to penetrate thru the hull and into the juice cells. The projections 14b are closely spaced as shown in Fig. 7. The holes are sufficiently large to permit rind oil and other suitable liquid, such as water, to flow therethru, carrying with it such small particles of the rind as may be removed during operation of the machine. Holes 27 extending thru table 14 are provided and each is located under one or more of the small holes 28 of sheet 14a. Larger, generally radially extending holes 29 extend thru table 14, partly to decrease the rotating mass of each table and partly to afford large passages thru which the rind oil and liquid mixed therewith may escape into pan 21. Members 19 and 20 are made of fillet material which is like member 14a.

Figure 8:
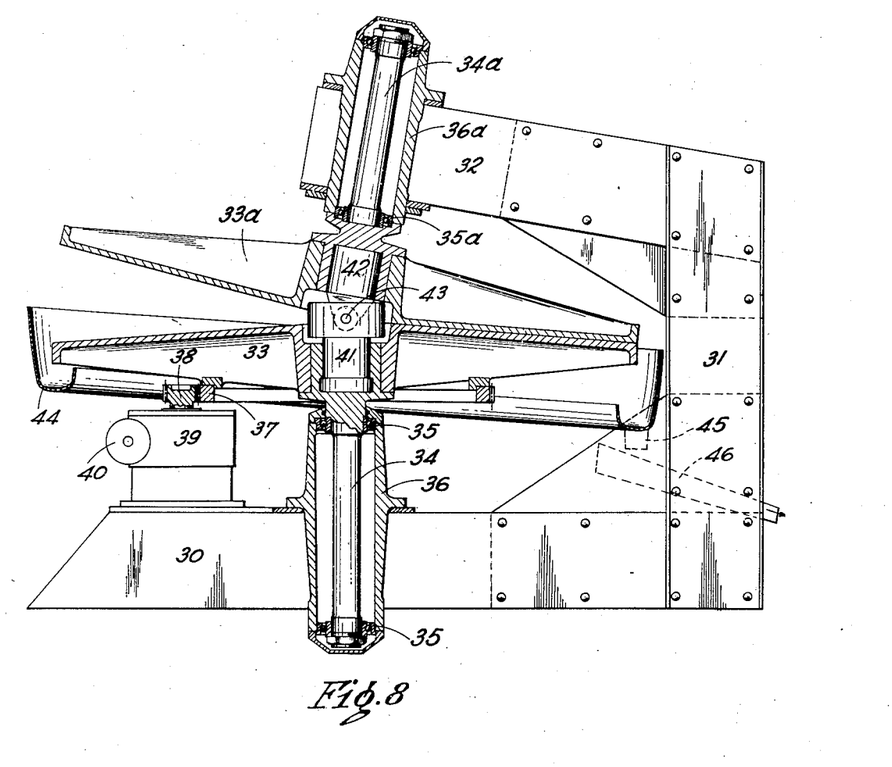
Fig. 8 is a vertical sectional view taken on line 8—8 of Fig. 5.

Apparatus AA of Figs. 4, 5 and 8 is one form of apparatus embodying the present invention which may be used for extracting juice from whole citrus fruit from which preferably the rind oil has been removed largely, if not entirely. This apparatus AA, as shown, consists of a supporting framework 30 having uprights 31 and a top member 32 to support two cooperating disks 33 and 33a, provided with conical opposed surfaces so that the surfaces will be parallel to or in contact with each other for substantially their full radial lengths in one vertical plane on one side of their axes of rotation and diverging from one another in the same plane on the opposite side of their axes.

The lower disk 33 is secured to a shaft 34 provided with anti-friction thrust bearings 35 carried in a bearing housing 36 supported by the frame 30. The disk 33 has an annular gear 37 on the under side thereof, the teeth of which mesh with a pinion 38 which may be driven in any suitable manner as by gearing (not shown) in the housing 39 which gearing is driven by shaft 40 from a suitable source of power.

The upper disk 33a is secured to a shaft 34a provided with anti-friction thrust bearings 35a in a bearing housing 36a carried by the top frame member 32. The two disks are connected together for rotation at the same speed by coupling members 41 and 42 connected respectively to the disk-carrying shafts and connected to each other by a pivoted or other suitable connection 43. The shaft 34 is preferably arranged vertically, while the shaft 34a is positioned at a small angle to the vertical, such angle being equal to the angle the top surface of the lower disk makes with a line perpendicular to the axis thereof. The disks in appparatus constructed as just described will contact with, or be parallel to each other, depending on the adjustment, as shown in Fig. 8, thruout their full radial length on one side of their axes in a vertical plane passing thru the axes and on the opposite side of their axes in the same plane will diverge from their central portions toward their peripheries, all as shown in Fig. 8.

Altho the apparatus of Fig. 8 has been shown with the frame 30 disposed horizontally, it will be understood that it is not essential that the frame be horizontal, for in fact it can be tilted more or less in various directions. However, for certain purposes it is desirable to have the frame tilted so that the open space between the disks 32 may be at an elevation somewhat higher than the opposite side of the disks to facilitate delivery of the whole fruit into the space between the disks and to insure flow of the juice away from the disks at their lower portion where the pressure is greatest, but such inclination should not be so great as to result in slippage of the hulls on disk 33 and thereby to impede ready removal of the fruit hulls to the conveyor, which carries them away from the apparatus.

In Fig. 8, 44 designates a fruit juice collecting trough which preferably surrounds the lower disks 33 and extends upwardly far enough to collect therein substantially all juice extracted by the apparatus. Trough 44 has a drain 45 which conducts juice from the trough into a second trough 46, whence it may be delivered for further processing.

In Figs. 4 and 5 the whole fruit from which rind oil has been extracted is delivered thru chute 24 to the space between disks 33 and 33a, guards 47 and 47a serving to direct such whole fruit toward the center of the disks. 48 designates an arm which directs fruit hulls from which the juice has been extracted toward a conveyor 49 which serves to carry such hulls away from the apparatus.

Figure 3:
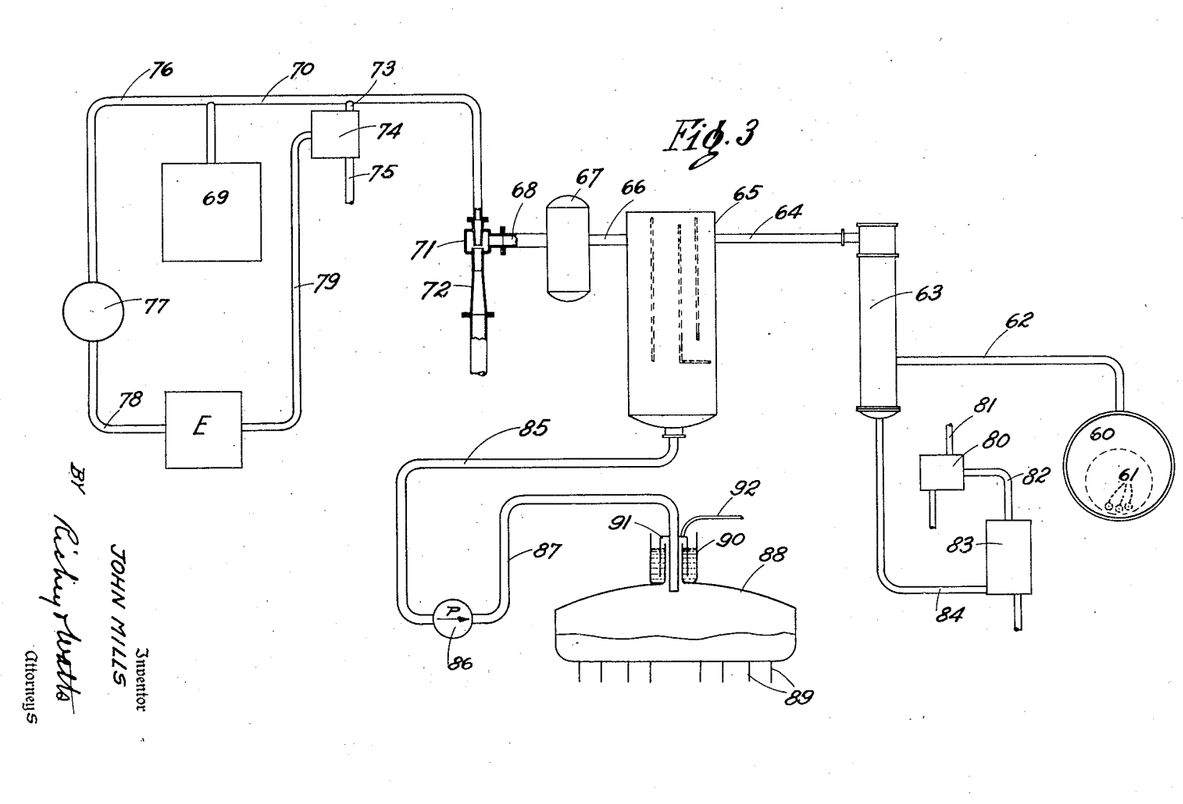
Fig. 3 is a diagrammatic view showing the apparatus designated on Fig. 1 by characters A, BB, B and parts of E.

Referring now to Fig. 3, 60 designates a steam generator consisting of a chamber thru which low pressure steam passes in tubes 61, thereby producing steam which passes thru pipe 62 into the juice heater 63 where it surrounds tubes (not shown) which extend lengthwise thereof. Steam condensing in the heater 63 may be withdrawn thru a bottom outlet (not shown). The tubes in this heater are connected by pipe 64 to the separator 65 equipped with baffles indicated by dotted lines and having an outlet pipe 66 leading to a steam condenser chamber 67 connected thru pipe 68 to a source of vacuum. The source of high pressure steam 69 is connected thru pipe 70 to chamber 71 having a Venturi-shaped outlet 72, the chamber 71 being in communication with pipe 68.

The pipe 70 has a branch 73 leading to chamber 74 which resembles chamber 71, in that it has a Venturi-shaped outlet 75 resembling part 72. The source of high pressure steam 69 is also connected to pipe 76 which communicates with an equalizer 77 and thence thru pipe 78 to the sterilizer E. The vacuum lines of sterilizer E are connected thru pipe 79 to vacuum chamber 74.

80 designates a screening device to which juice from juice extractor AA is delivered thru pipe 81 and from which the juice, substantially free from pulp, is delivered thru pipe 82 to tank 83, constituting a reservoir from which juice may flow thru pipe 84 to the tubes in heater 63. Under the influence of the vacuum existing in the system the juice is caused to flow through the tubes of the heater 63. The heat of the steam is transferred to the juice, thus causing a certain amount of low temperature boiling and evaporation, and resulting in the liberation of any gases which may be present in the juice. The juice, vapors and liberated gases pass through the pipe 64 to the separator 65, in which chamber the treated juice falls to the bottom while the vapors and gases pass out through the pipe 66 to the condenser 67.

Separator 65 has a bottom outlet pipe 85 leading to a pump 86 which is connected by pipe 87 with the interior of chamber 88, which chamber is provided with a plurality of discharge tubes 89 for discharging a measured quantity of liquid into a can, after the manner of can filling machines now in common use. The chamber 88 is provided with a liquid seal consisting of an upright cup shaped outer member 90 and an inverted cup shaped member 91 with liquid contained in cup 90 to a level above the bottom or open end of cup 91. The latter cup is carried by stationary pipe 87 while the former cup is carried by the rotating chamber 88 so that relative movement between the two cups may take place without breakage of the liquid seal. A tube 92, leading into cup 91 permits the maintenance of an inert atmosphere, such as nitrogen or carbon dioxide, in chamber 88 above the level of juice therein.

Fig. 9 shows somewhat diagrammatically a simplified sterilizing apparatus wherein 100 designates a can partly filled with fruit juice and having a dome shaped cover 101 thereon, through which a tube 102 connected to a source of steam under pressure extends into the juice. The portion of the tube 102 below the surface of the juice in the can 100 is perforated preferably with downwardly extending holes, so that steam released into tube 102 will project downwardly into all portions of the juice, thereby sterilizing the juice thoroughly. Vent tube 103 permits escape of uncondensed steam.

Various types of apparatus may be used for sterilizing according to the principle of Fig. 9. For example, the juice in one can, or a plurality of cans, can be sterilized at one time by inserting a tube 102 in each can, simply by lowering or otherwise moving the tubes 102 with their covers 101 into position with respect to the can or cans and then removing them after the sterilization has been carried on to the desired extent. Alternatively, a plurality of tubes 102 and covers 101 may be mounted on a rotating turret, and cans containing juice to be sterilized may be brought into sterilizing position with respect to the tubes and covers after the fashion of feeding cans to be filled with liquid to a can filling machine.

According to one method of practicing the present invention whole oranges are delivered thru chute 23 to the rind oil extractor AAA wherein rind oil is liberated from the oil cells and such oil is withdrawn thru pipe 22 of the collecting means. As is more completely described in my copending application Ser. No. 42,870 filed September 30, 1935, the fruit delivered to the lefthand table 14 is given a high velocity and centrifugal force by rotation of the table, and is advanced within the limited space between the turns of members 19 and is thus caused to roll, turn and bounce about and to be brought rapidly into contact with the projections on the members 19 and table 14, thereby puncturing rind oil cells and liberating rind oil. The fruit is thus propelled along the paths defined by the turns of member 19 and is delivered onto the righthand table 14 which is also rotating at high velocity, where substantially the same action is continued until the fruit reaches the central portion of the latter table, where it falls into the hollow shaft 6 and rolls along chute 24. During the travel of the fruit in this manner thru the extractor AAA water or other suitable liquid is being sprayed downwardly thereon, as thru nozzles 26, this liquid serving to wash the rind oil from the fruit and into the collecting pan 21 from which it may be withdrawn as thru pipe 22.

By varying the speed of rotation of the tables 14, it is possible to control within approximate limits the amount of rind oil remaining in the fruit. The hull of the whole fruit is punctured at a multitude of closely spaced points throughout substantially its entire exterior surface, and the major quantity of the rind oil is removed from substantially the entire surface of the fruit in a controlled manner. For example, with tables about 6 feet in diameter and rotating at a speed of about 75 to about 150 R. P. M. only a small amount of rind oil is carried away by the fruit discharged thru chute 24. This amount is so small that part thereof which becomes mixed with the juice extracted by the juice extractor AA is sufficient to give only a perceptible flavor to the finally packaged juice. By operating tables 14 at higher speeds or by using larger tables and operating them at the same or lower or higher speeds, the amount of rind oil in the final juice product can be decreased until none, or substantially none, is present. In the operation of this rind oil extractor, it is preferable to leave in the hull of the fruit only a small regulated quantity of rind oil. The rind oil is extracted as described above without removing any substantial areas of the hull from the fruit.

The whole, unbroken fruit discharged from the rind oil extractor AAA thru chute 24, is delivered to the juice extractor AA of Figs. 4, 5 and 8. This whole fruit is gripped between disks 33 and 33a and gradually compressed until it passes the point where the disks are nearest to each other, after which the squeezed hulls are carried into contact with scraper 48, which diverts them to or toward conveyor 49. The disks 33 and 33a first compress the whole fruit, rupturing and breaking open the hull and then squeezing the juice from the juice cells thru the ruptures or openings in the hull without squeezing out much, if any, pulp and practically no rag or juice cell partitions. A small amount of the remaining rind oil in the hull is removed therefrom simultaneously with the juice and mixed therewith. The juice so expressed runs off the disks and collects in trough 44, whence it runs thru pipe 81 (Figure 3) into the screening mechanism 80 and then into reservoir 83, from which it passes into the tubes of steam heated chamber 63. The flow of steam under high pressure from source 69 thru chamber 71 creates a high vacuum on the juice in these tubes and together with the slugs of expanding vapor in the tubes accelerates the flow of the juice thru pipe 64 to a high speed.

While it is not known exactly what action takes place in the heater 63 under the combined actions of heat and vacuum, it seems probable that the water in the juice is rapidly vaporized and that the vapor and gases expand quickly, with resultant formation of quantities of gases alternating with quantities of juice in the pipes of the heater 63. This action is probably like that which takes place in a coffee percolator. When these materials pass into the separator 65, the gases immediately separate from the juice and the juice, traveling at considerable velocity, impinges against the baffles which break it up into small masses and facilitates separation of further amounts of gases of vapor therefrom. The vapors and gases quickly escape from the separator 65 while the juice collects in the bottom thereof. It is substantially deaerated and is concentrated to a greater or less extent, depending upon the temperature and time of heating in heater 63. The water vapor which condenses in chamber 67 may be withdrawn thru a discharge outlet (not shown). In cases where the sterilizer E, such as is shown in my United States Patent No. 2,054,092 is used, it is preferable to regulate the time and temperature of heating of the juice so that the juice collecting in separator 65 will be concentrated to about 90% of the volume of the juice delivered into heater 63, for sterilizer E tends to dilute the juice to the extent of about 10% by condensation of steam.

The thus deaerated and concentrated juice is delivered thru pipes 85 and 87 and pump 86 from chamber 65 into chamber 88 of the can filler and the vacuum on such juice is broken in the latter chamber, preferably in an inert atmosphere, such as that of nitrogen, carbon dioxide or the like. Then the juice is discharged thru outlets 89 into cans which, according to Fig. 1, are then capped, i. e., supplied with top ends provided with a valve such as that shown in Figs. 13 and 14 of my United States Patent No. 2,054,092 and the cans are passed thru preheater D wherein the temperature of the juice is raised to between about 100° F. and about 120° F. as is described in the United States Patent No. 2,054,066 of Ayers and Lang. Such preheated cans are then delivered to sterilizer E, which may be of the type and construction shown in Figs. 2 to 10 inclusive of my United States Patent No. 2,054,092 where vacuum is applied to the interior of the can above the juice, thereby removing much of the air in such space and tending to remove any air or other gases entrapped in the juice and then immediately thereafter steam is liberated below the surface of the level of juice in the can so as to bubble up thru the juice and contact with all portions thereof. Steam at temperatures between about 225° F. and about 260° F. is suitable, and if applied within a period of a few seconds, such as from about 7 to about 15 seconds, has been found sufficient to render the juice commercially sterile. This treatment raises the juice to a temperature of between about 212° F. and about 235° F. Then the steam connection to the can is broken with steam pressure in the latter, which pressure serves to seat the movable part of the valve, and the can end is promptly crimped back of the movable valve part to retain it in seated, permanently sealing position. Then the can is cooled as by being passed thru cooler F so that the temperature of the juice is lowered to below about 110° F. within about two minutes.

It will, of course, be understood that various modifications of the foregoing detailed process may be made. For example, the juice may be obtained by apparatus other than by means of rind oil extractor AAA and a juice extractor such as AA, or different devices may be substituted for either or both of these devices; also the vacuum breaker BB may be omitted, as well as the concentrator A, the preheater D and the cooler F, or any one or more of these devices may be omitted. However, while it is preferable to use all the foregoing devices, it is highly desirable to use devices for screening pulp from the juice, deaerating the juice and sterilizing, sealing and rapidly cooling it.

The method illustrated in Fig. 2 may be like that described in connection with Fig. 1, from the rind oil extractor AAA to and including the can filler B, altho the concentrator herein shown may be so operated as above pointed out as to serve primarily as a deaerator in cases where there will be little or no dilution of the juice by condensation of steam therein during sterilization. While use of the preheater D of Fig. 2 is preferred and is like that already described in connection with the same device in Fig. 1, it is not essential, particularly where the sterilizer G of Fig. 2 is to be employed. After sterilization by sterilizer G, the can with its sterilized juice is capped by an ordinary capping machine, i. e., the top end of the can is put in place and is crimped and sealed to the can body. After sealing the cans may be immediately turned on their side or inverted in such manner as to expose the added end to the commercial sterilizing action of the hot juice for a period of about 5 seconds to about 30 seconds before cooling.

Orange juice embodying the present invention, and briefly described hereinabove, differs in certain outstanding particulars from orange juice packaged by most processes in commercial use heretofore. For example, it differs from fruit juice which has been obtained by reaming in that it does not contain coarse pulp in the form of white rag from the hull, or the stringy fibers which form the dividers for the juice cells. Very little pulp is present in juice packaged by the present invention and such pulp as is present is extremely finely divided. Juice extracted by pressing the fruit containing its rind oil is substantially free from rag, but is contaminated with large quantities of rind oil, and heretofore such juices have not been suitable for human consumption. The juice of the present invention thus possesses the advantages of prior processes without the attendant disadvantages of any of them, for it is free from rag and coarse pulp and contains no rind oil, or only a controlled and desired amount thereof. While it is difficult to determine exactly how much rind oil is the proper amount to have in the final packaged orange juice, it is believed that it is sufficient to say that such oil should not be present in amounts greater than will give a slight flavor to the juice without giving it any bitter or disagreeable taste.

What has been stated hereinabove with respect to the properties and characteristics of orange juice, will be understood to apply to other citrus fruits having rind oil. Moreover, all fruit juices packaged by the present invention are rendered commercially sterile without the use of added sugar or other preservatives, have the taste, flavor, color and vitamin content which is substantially that of juice of fresh tree-ripened fruit and may be kept without deterioration or marked change in any of these properties or characteristics for long periods of time.

The foregoing detailed description relates more particularly to citrus fruit juices. It will be understood that certain parts of that process will not be needed where non-citrus fruit juices or vegetable juices are to be treated. For example, apples, pears, grapes, and berries need not be treated for removal of rind oil. Similarly their juices might not readily separate from the pulp in a press such as is described. It will thus be obvious that any suitable means for extracting the particular juice in question is contemplated and that when obtained, the juice may be treated as herein described. In the case of vegetable juices which are not highly acid the sterilizing temperature should range between about 240° F. and about 260° F.

Having thus described my invention, what I desire to secure by Letters Patent is defined in what is claimed.

What is claimed is:

1. The method of packaging citrus fruit juices which includes the steps of continuously moving the fruit in a controlled manner through a curved path of travel defined by stationary walls, puncturing the hull of the whole fruit at a multitude of closely spaced points by repeatedly bringing the fruit into instantaneous contact with relatively short oil cell opening projections on the stationary walls while turning the fruit to bring substantially its entire external area into contact with the projections, thereby removing the major quantity of the rind oil from substantially the entire surface of the fruit and leaving therein only a small regulated quantity of the rind oil without removing any substantial areas of the hull from the fruit, opening the fruit and removing the juice therefrom by squeezing the whole fruit to rupture the hull and force the juice therefrom, and simultaneously removing from the hull of the fruit and mixing with the juice a regulated remaining small amount of rind oil sufficient for flavoring purposes, sterilizing the juice and sealing it in containers.

2. The method of packing citrus fruit juices which includes the steps of continuously moving the fruit in a controlled manner through a curved path of travel defined by stationary walls, puncturing the hull of the whole fruit at a multitude of closely spaced points by repeatedly bringing the fruit into instantaneous contact with relatively short oil cell opening projections on the stationary walls while turning the fruit to bring substantially its entire external area into contact with the projections, thereby removing the major quantity of the rind oil from substantially the entire surface of the fruit and leaving therein only a small regulated quantity of the rind oil without removing any substantial areas of the hull from the fruit, opening the fruit and removing the juice therefrom by squeezing the whole fruit to rupture the hull and force the juice therefrom, and simultaneously removing from the hull of the fruit and mixing with the juice a regulated remaining small amount of rind oil sufficient for flavoring purposes, placing such juice in a final container, sterilizing the juice therein by liberating steam into the container, and sealing the container.

3. The method of packaging citrus fruit juices which includes the steps of continuously moving the fruit in a controlled manner through a curved path of travel defined by stationary walls, puncturing the hull of the whole fruit at a multitude of closely spaced points by repeatedly bringing the fruit into instantaneous contact with relatively short oil cell opening projections on the stationary walls while turning the fruit to bring substantially its entire external area into contact with the projections, thereby removing the major quantity of the rind oil from substantially the entire surface of the fruit and leaving therein only a small regulated quantity of the rind oil without removing any substantial areas of the hull from the fruit, opening the fruit and removing the juice therefrom by squeezing the whole fruit to rupture the hull and force the juice therefrom, and simultaneously removing from the hull of the fruit and mixing with the juice a regulated remaining small amount of rind oil sufficient for flavoring purposes, deaerating the juice, sterilizing the juice and sealing it in containers.

4. The method of packaging citrus fruit juices which includes the steps of continuously moving the fruit in a controlled manner through a curved path of travel defined by stationary walls, puncturing the hull of the whole fruit at a multitude of closely spaced points by repeatedly bringing the fruit into instantaneous contact with relatively short oil cell opening projections on the stationary walls while turning the fruit to bring substantially its entire external area into contact with the projections, thereby removing the major quantity of the rind oil from substantially the entire surface of the fruit and leaving therein only a small regulated quantity of the rind oil without removing any substantial areas of the hull from the fruit, opening the fruit and removing the juice therefrom by squeezing the whole fruit to rupture the hull and force the juice therefrom, and simultaneously removing from the hull of the fruit and mixing with the juice a regulated remaining small amount of rind oil sufficient for flavoring purposes, concentrating and deaerating the juices, placing such juices in a final container, sterilizing the juices in the container by liberating steam into the juices, and sealing the container.

5. The method of packaging citrus fruit juices which includes the steps of continuously moving the fruit in a controlled manner through a curved path of travel defined by stationary walls, puncturing the hull of the whole fruit at a multitude of closely spaced points by repeatedly bringing the fruit into instantaneous contact with relatively short oil cell opening projections on the stationary walls while turning the fruit to bring substantially its entire external area into contact with the projections, thereby removing the major quantity of the rind oil from substantially the entire surface of the fruit and leaving therein only a small regulated quantity of the rind oil without removing any substantial areas of the hull from the fruit, opening the fruit and removing the juice therefrom by squeezing the whole fruit to rupture the hull and force the juice therefrom, and simultaneously removing from the hull of the fruit and mixing with the juice a regulated remaining small amount of rind oil sufficient for flavoring purposes, concentrating and deaerating the juices under heat and vacuum, placing such juices in a final container, sterilizing the juices therein, and sealing the container.

6. The method of packaging citrus fruit juices which includes the steps of continuously moving the fruit in a controlled manner through a curved path of travel defined by stationary walls, puncturing the hull of the whole fruit at a multitude of closely spaced points by repeatedly bringing the fruit into instantaneous contact with relatively short oil cell opening projections on the stationary walls while turning the fruit to bring substantially its entire external area into contact with the projections, thereby removing the major quantity of the rind oil from substantially the entire surface of the fruit and leaving therein only a small regulated quantity of the rind oil without removing any substantial areas of the hull from the fruit, opening the fruit and removing the juice therefrom by squeezing the whole fruit to rupture the hull and force the juice therefrom, and simultaneously removing from the hull of the fruit and mixing with the juice a regulated remaining small amount of rind oil sufficient for flavoring purposes, placing such juices in a final container, vacuumizing said container, sterilizing the juices in the vacuumized container by liberating steam into the juices, and sealing the container with steam pressure therein.

JOHN MILLS.